US012286532B2

(12) United States Patent
Motegi et al.

(10) Patent No.: US 12,286,532 B2
(45) Date of Patent: *Apr. 29, 2025

(54) THERMOPLASTIC RESIN COMPOSITION AND OPTICAL MEMBER USING SAME

(71) Applicant: MITSUBISHI GAS CHEMICAL COMPANY, INC., Tokyo (JP)

(72) Inventors: Atsushi Motegi, Tokyo (JP); Kentaro Ishihara, Tokyo (JP); Katsushi Nishimori, Tokyo (JP); Shinya Ikeda, Tokyo (JP); Noriyuki Kato, Tokyo (JP); Mitsuteru Kondo, Tokyo (JP); Kensuke Oshima, Tokyo (JP); Masahiro Kanda, Tokyo (JP); Shoko Suzuki, Tokyo (JP); Tatsunobu Ogata, Tokyo (JP); Mitsutake Suematsu, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 828 days.

This patent is subject to a terminal disclaimer.

(21) Appl. No.: 17/414,407

(22) PCT Filed: Dec. 24, 2019

(86) PCT No.: PCT/JP2019/050552
§ 371 (c)(1),
(2) Date: Jun. 16, 2021

(87) PCT Pub. No.: WO2020/138050
PCT Pub. Date: Jul. 2, 2020

(65) Prior Publication Data
US 2022/0106483 A1   Apr. 7, 2022

(30) Foreign Application Priority Data

Dec. 27, 2018  (JP) ................. 2018-244717

(51) Int. Cl.
| C08L 69/00 | (2006.01) |
| C08G 64/06 | (2006.01) |
| C08K 5/00 | (2006.01) |
| C08L 67/02 | (2006.01) |
| G02B 1/04 | (2006.01) |
| G02B 5/22 | (2006.01) |

(52) U.S. Cl.
CPC ............ *C08L 69/005* (2013.01); *C08G 64/06* (2013.01); *C08K 5/0041* (2013.01); *C08L 67/025* (2013.01); *G02B 1/041* (2013.01); *G02B 5/22* (2013.01)

(58) Field of Classification Search
CPC .......... G02B 1/041; G02B 5/22; C08G 64/30; C08G 64/04; C08G 63/64; C08G 64/06; C08L 69/005; C08L 69/00; C08L 67/025; C08J 2369/00

See application file for complete search history.

(56) References Cited

U.S. PATENT DOCUMENTS

| 11,286,342 | B2 * | 3/2022 | Kato ..................... C08G 64/30 |
| 2004/0126504 | A1 | 7/2004 | Ouchi et al. |
| 2010/0048855 | A1 | 2/2010 | Kato et al. |
| 2015/0285954 | A1 | 10/2015 | Ishizuka et al. |
| 2016/0170105 | A1 | 6/2016 | Nagaya et al. |
| 2017/0276846 | A1 | 9/2017 | Ishido et al. |
| 2018/0305496 | A1 * | 10/2018 | Kato ..................... C08G 63/66 |
| 2018/0321423 | A1 | 11/2018 | Kato et al. |
| 2019/0241703 | A1 | 8/2019 | Kato et al. |
| 2019/0243039 | A1 * | 8/2019 | Takishita ................. G02B 5/22 |

FOREIGN PATENT DOCUMENTS

| JP | 55-62410 A | 5/1980 |
| JP | 62-53801 B2 | 11/1987 |
| JP | 2002-317048 A | 10/2002 |
| JP | 2008-009222 A | 1/2008 |
| JP | 2011-132316 A | 7/2011 |
| JP | 2012-145481 A | 8/2012 |
| JP | 2012-242340 A | 12/2012 |
| JP | 2014-159512 A | 9/2014 |
| JP | 2014-185325 A | 10/2014 |
| JP | 2018-2895 A | 1/2018 |
| JP | 2018-044991 A | 3/2018 |
| JP | 2018-59107 A | 4/2018 |
| JP | 2018-109734 A | 7/2018 |

(Continued)

OTHER PUBLICATIONS

International Search Report issued in International Patent Application No. PCT/JP2019/050552, dated Mar. 31, 2020, along with English translation thereof.
Written Opinion of the International Searching Authority issued in International Patent Application No. PCT/JP2019/050552, dated Mar. 31, 2020, along with English translation thereof.
Office Action Dec. 12, 2023 in corresponding Japanese family member application No. 2020-563291 with English language translation.
Notice of Third Party Observation to the corresponding Japanese Patent Application No. 2020-563291 mailed Oct. 5, 2021, along with English translation thereof.
Extended European Search Report issued in corresponding European Patent App. No. 19902145.2, dated Jan. 18, 2022.

(Continued)

*Primary Examiner* — Gregory Listvoyb
(74) *Attorney, Agent, or Firm* — GREENBLUM & BERNSTEIN, P.L.C.

(57) ABSTRACT

A thermoplastic resin composition that cuts visible light and has infrared light transmittance. A thermoplastic resin composition including a thermoplastic resin and a coloring material, wherein the refractive index at a wavelength of 894 nm is 1.60 or greater, and when the thickness of the thermoplastic resin composition is 1 mm, the maximum value of the transmittance of wavelengths of 380 nm-630 nm is greater than 0% and less than or equal to 1.00%, and the average transmittance of wavelengths of 840 nm-940 nm is greater than or equal to 80%.

11 Claims, No Drawings

(56) References Cited

FOREIGN PATENT DOCUMENTS

| WO | 2007/142149 | A1 |   | 12/2007 |   |          |
|----|-------------|----|---|---------|---|----------|
| WO | 2015/056734 | A1 |   | 4/2015  |   |          |
| WO | 2016/098810 | A1 |   | 6/2016  |   |          |
| WO | 2017/078076 | A1 |   | 5/2017  |   |          |
| WO | WO-2017078075 | A1 | * | 5/2017 | ......... | C08G 63/199 |
| WO | 2018/016516 | A1 |   | 1/2018  |   |          |
| WO | WO-2018092600 | A1 | * | 5/2018 | ............. | G02B 3/00 |

OTHER PUBLICATIONS

Written Submission of Publication dated Oct. 11, 2023 in connection with corresponding family member Japanese patent application No. 2020-563291, with English language translation thereof.

Kamachi, A Guide to Polymer Chemistry, NTS Inc. Dec. 21, 2018, with English language translation thereof.

Written Submission of Publication issued in JP Patent Application No. 2020-563291, May 14, 2024, received May 21, 2024, translation.

Written Submission of Publication in connection with JP Patent Application No. 2020-563291, dated November. 29, 2024 and received Dec. 3, 2024, translation.

Ko-bunshi Zairyo Kagaku (Polymer Material Chemistry), Asakura Publishing Co., Ltd., Sep. 1, 1994 with partial English translation).

Sentan Seikei-Kakou Gijutsu (Advanced Forming and Processing Technology), Sigma Insatsu Co., Ltd., Dec. 25, 1999 (with partial English translation).

Haruhiko Maki, "Phase Difference Film and its Production Method", Seikei-Kakou, vol. 17, No. 9, 2005.

* cited by examiner

THERMOPLASTIC RESIN COMPOSITION AND OPTICAL MEMBER USING SAME

TECHNICAL FIELD

The present invention relates to a thermoplastic resin composition, and more particularly to a thermoplastic resin composition containing a high refractive index material, and an optical lens using said thermoplastic resin composition.

BACKGROUND ART

Infrared cameras and infrared sensors visualize infrared light emitted from an object as changes in the infrared radiation that follow changes in the temperature of the object and they work stably in the darkness in a way comparable to detection of visible light or the like. Infrared cameras and infrared sensors are widely employed, for example, for diagnosis in the medical field, for non-destructive inspection for finding deterioration of building structures, electrical installations and the like, in night vision cameras used in the field of security, for personal authentication such as biometric authentication cameras in ATMs of financial institutions and at the airport.

In general, an infrared camera or an infrared sensor is provided with a semiconductor such as a silicon semiconductor as a device for detecting infrared light. Such semiconductors, however, detect not only infrared light but also visible light. Therefore, the material used for an infrared camera/sensor lens is required to have the properties of detecting infrared light while cutting visible light.

Conventionally, optical glasses or optical resins have been used as a material of an optical element used in optical systems of various cameras such as cameras, film-integrated cameras and video cameras. Among them, visible light cut-off materials made of bisphenol A-polycarbonate or the like are known as optical resins that can detect infrared light and can cut visible light, and they are used as infrared pass filters and the like (Patent documents 1-3).

However, a thermoplastic resin composition containing a high refractive index material, and an optical lens using said thermoplastic resin composition are unknown.

PRIOR ART DOCUMENTS

Patent Documents

Patent document 1: JP S55-62410 A
Patent document 2: WO 2015/056734
Patent document 3: JP S62(1987)-53801 B

SUMMARY OF INVENTION

Problem to be Solved by the Invention

Developments of a thermoplastic resin composition containing a high refractive index material as a material that cuts visible light and has infrared light transmittance and an optical lens using said resin composition have been desired.

Means for Solving the Problem

The present inventors have gone through extensive studies and as a result of which they developed a thermoplastic resin composition comprising a thermoplastic resin and a coloring material as an optical lens material that cuts visible light and has infrared light transmittance, thereby accomplishing the present invention.

The present invention comprises the following embodiments.

(1) A thermoplastic resin composition comprising a thermoplastic resin and a coloring material, wherein:
the refractive index at a wavelength of 894 nm is 1.60 or higher; and
when the thickness of said thermoplastic resin composition is 1 mm, the maximum transmittance at wavelengths of 380-630 nm is more than 0% and less or equal to 1.00%, and the average transmittance at wavelengths of 840-940 nm is 80% or more.

(2) The thermoplastic resin composition according to (1) above, wherein the thermoplastic resin comprises a resin selected from the group consisting of a polycarbonate resin, a polyester resin and a polyester carbonate resin.

(3) The thermoplastic resin composition according to (2) above, wherein the thermoplastic resin comprises, as a monomer, a diol compound selected from the group consisting of compounds represented by General formulae (I), (II) and (III) below:

[Chemical formula 1]

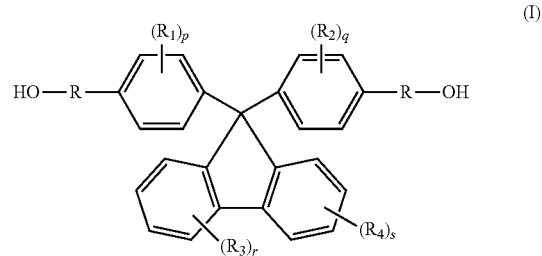

(in General formula (I), $R_1$-$R_4$ each independently represent a hydrogen atom, a fluorine atom, a chlorine atom, a bromine atom, an iodine atom, a C1-C6 alkyl group, or a C6-C20 aryl group, a C2-C6 alkenyl group, a C1-C6 alkoxy group or a C7-C17 aralkyl group which may contain a heterocyclic atom selected from an oxygen atom, a nitrogen atom and a sulfur atom, p, q, r and s each independently represent an integer of 0-4, and R is

[Chemical formula 2]

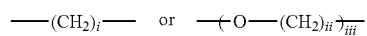

wherein i represents an integer of 0-10, ii represents an integer of 1-10, and iii represents an integer of 1-10);

[Chemical formula 3]

(II)

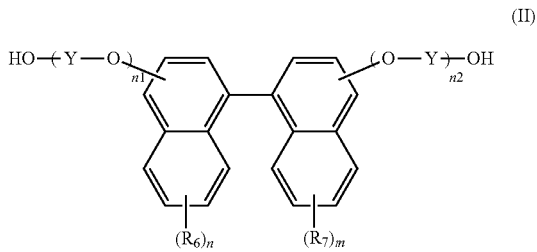

(in General formula (II),
$R_6$ and $R_7$ are synonymous with $R_1$-$R_4$,
n and m represent an integer of 0-5,
Y represents a C1-C5 alkylene group, and
n1 and n2 each independently represent an integer of 0-10); and

[Chemical formula 4]

(III)

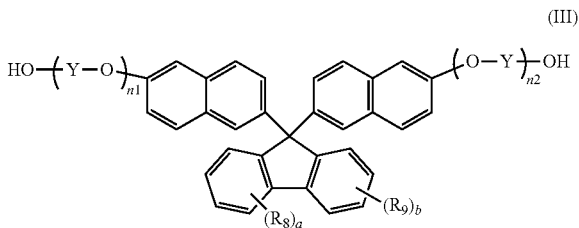

(in General formula (III),
$R_8$ and $R_9$ are synonymous with $R_1$-$R_4$,
a and b represent an integer of 0-4,
Y represents a C1-C5 alkylene group, and
n1 and n2 each independently represent an integer of 0-10).

(4) The thermoplastic resin composition according to any one of (1)-(3) above, wherein the coloring material comprises at least one of a green pigment, a red pigment, a yellow pigment and a purple pigment.

(5) The thermoplastic resin composition according to any one of (1)-(3) above, wherein the coloring material comprises at least one of an anthraquinone-based pigment, a perinone-based pigment, a methine-based pigment, an isoindoline-based pigment, a phthalocyanine-based pigment, a quinacridone-based pigment, an azo-based pigment and a lake pigment.

(6) The thermoplastic resin composition according to any one of (1)-(5) above, wherein when the thickness of said thermoplastic resin composition is 1 mm, the maximum transmittance at wavelengths of 380-630 nm is more than 0% and less or equal to 0.8%.

(7) The thermoplastic resin composition according to any one of (1)-(6) above, wherein when the thickness of said thermoplastic resin composition is 1 mm, the maximum transmittance at wavelengths of 380-630 nm is more than 0% and less or equal to 0.5%.

(8) An optical lens comprising the thermoplastic resin composition according to any one of (1)-(7) above.

(9) An infrared camera lens comprising the thermoplastic resin composition according to any one of (1)-(7) above.

(10) A biometric authentication camera lens comprising the thermoplastic resin composition according to any one of (1)-(7) above.

Effect of the Invention

A thermoplastic resin composition containing a high refractive index material of the present invention has infrared light transmittance and cuts visible light, and thus is capable of reducing noise caused by visible light. Hence, an optical lens using the thermoplastic resin composition of the present invention is capable of enhancing image accuracy of an infrared camera or an infrared sensor. In addition, the thermoplastic resin composition of the present invention can be used as an optical lens to increase power of the optical lens or reduce the number of the optical lenses used. Moreover, since filterless application can be realized, the number of parts and height can be reduced as compared to techniques that cut visible light by means such as an infrared pass filter.

MODES FOR CARRYING OUT THE INVENTION

Hereinafter, the present invention will be described in detail.
1. Thermoplastic Resin Composition
The present invention provides a thermoplastic resin composition comprising a thermoplastic resin and a coloring material.
(A) Thermoplastic Resin
In one embodiment of the present invention, examples of a thermoplastic resin that can be used in the thermoplastic resin composition include, but not limited to, a polycarbonate resin, a polyester resin and a polyester carbonate resin. In a preferred embodiment of the present invention, the thermoplastic resin composition is a polycarbonate resin.

In one embodiment of the present invention, a thermoplastic resin that can be used in the thermoplastic resin composition may contain, as a monomer, a diol compound selected from the group consisting of compounds represented by General formulae (I), (II) and (III) below:

[Chemical formula 5]

(I)

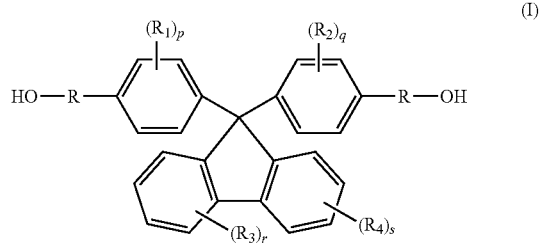

(in General formula (I),
$R_1$-$R_4$ each independently represent a hydrogen atom, a fluorine atom, a chlorine atom, a bromine atom, an iodine atom, a C1-C6 alkyl group, or a C6-C20 aryl group, a C2-C6 alkenyl group, a C1-C6 alkoxy group or a C7-C17 aralkyl group which may contain a heterocyclic atom selected from an oxygen atom, a nitrogen atom and a sulfur atom,
p, q, r and s each independently represent an integer of 0-4, and R is

[Chemical formula 6]

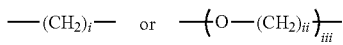

wherein, i represents an integer of 0-10, ii represents an integer of 1-10, and iii represents an integer of 1-10;

[Chemical formula 7]

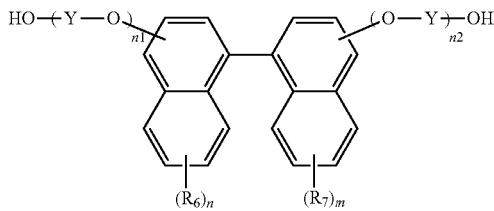
(II)

(in General formula (II),
$R_6$ and $R_7$ are synonymous with $R_1$-$R_4$,
n and m represent an integer of 0-5,
Y represents a C1-C5 alkylene group, and
n1 and n2 each independently represent an integer of 0-10); and

[Chemical formula 8]

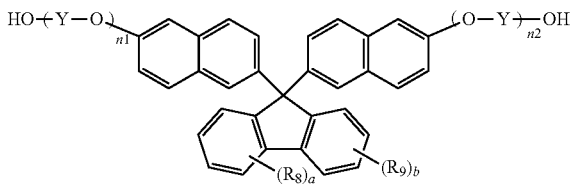
(III)

(in General formula (III),
$R_8$ and $R_9$ are synonymous with $R_1$-$R_4$,
a and b represent an integer of 0-4,
Y represents a C1-C5 alkylene group, and
n1 and n2 each independently represent an integer of 0-10).

Specific examples of the monomer represented by General formula (I) above include, but not limited to, 9,9-bis(4-hydroxy-3-ethylphenyl)fluorene, 9,9-bis(4-hydroxy-3-methylphenyl)fluorene, 9,9-bis(4-hydroxyphenyl)fluorene, 9,9-bis[4-(2-hydroxyethoxy)phenyl]fluorene, 9,9-bis[4-(2-hydroxyethoxy)-3-methylphenyl]fluorene, 9,9-bis[4-(2-hydroxyethoxy)-3-tert-butylphenyl]fluorene, 9,9-bis[4-(2-hydroxyethoxy)-3-isopropylphenyl]fluorene, 9,9-bis[4-(2-hydroxyethoxy)-3-cyclohexylphenyl]fluorene, 9,9-bis[4-(2-hydroxyethoxy)-3-phenylphenyl]fluorene, 4-(9-(4-hydroxyethoxy)phenyl)-9H-fluorene-9-yl)phenol, 2,2'(9H-fluorene-9,9'-diyl)bis(ethane-1-ol) and 9H-fluorene-9,9-diyl)dimethanol. One or more of these monomers can be used alone or in combination.

Among the monomers represented by General formula (I) above, 9,9-bis[4-(2-hydroxyethoxy)phenyl]fluorene, 9,9-bis[4-(2-hydroxyethoxy)-3-phenylphenyl]fluorene and 9,9-bis[4-(2-hydroxy)phenyl]fluorene are preferable, and 9,9-bis[4-(2-hydroxyethoxy)phenyl]fluorene and 9,9-bis[4-(2-hydroxyethoxy)-3-phenylphenyl]fluorene are more preferable.

Specific examples of the monomer represented by General formula (II) above include, but not limited to, 2,2'-bis(1-hydroxymethoxy)-1,1'-binaphthalene, 2,2'-bis(2-hydroxyethoxy)-1,1'-binaphthalene (also referred to as "BHEBN"), 2,2'-bis(3-hydroxypropyloxy)-1,1'-binaphthalene, 2,2'-bis(4-hydroxybutoxy)-1,1'-binaphthalene, 2,2'-bis(2-hydroxyethoxy)-6,6'-diphenyl-1,1'-binaphthalene (also referred to as "BINL-2EO"), 9,9-bis(6-(2-hydroxyethoxy)naphthalene-2-yl)fluorene (also referred to as "BNEF"), 2,2'-bis(2-hydroxyethoxy)-1,1'-binaphthalene (also referred to as "BNE"), 9,9-bis(4-(2-hydroxyethoxy)phenyl)fluorene (also referred to as "BPEF"), 9,9-bis(4-(2-hydroxyethoxy)-3-phenylphenyl)fluorene (also referred to as "BPPEF"), 2,2'-bis(2-hydroxyethoxy)-6,6'-di(naphthalene-1-yl)-1,1'-binaphthalene (also referred to as "DNBINOL-2EO"), 2,2'-bis(2-hydroxyethoxy)-6,6'-di(naphthalene-2-yl)-1,1'-binaphthalene (also referred to as "2DNBINOL-2EO"), 2,2'-bis(2-hydroxyethoxy)-6,6'-di(phenanthrene-9-yl)-1,1'-binaphthalene (also referred to as "9DPNBINOL-2EO"), 6,6'-di-(3-cyanophenyl)-2,2'-bis(2-hydroxyethoxy)-1,1'-binaphthalene (also referred to as "CN-BNA"), 6,6'-di-(dibenzo[b,d]furan-4-yl)-2,2'-bis(2-hydroxyethoxy)-1,1'-binaphthalene (also referred to as "FUR-BNA"), 6,6'-di-(dibenzo[b,d]thiene-4-yl)-2,2'-bis(2-hydroxyethoxy)-1,1'-binaphthalene (also referred to as "THI-BNA"), 2,2'-bis(2-hydroxyethoxy)-6,6'-di(naphthalene-2-yl-ethynyl)-1,1'-binaphthalene (also referred to as "D2NACBHBNA") and 2,2'-bis(2-hydroxyethoxy)-6,6'-di(phenylethynyl)-1,1'-binaphthalene (also referred to as "DPACBHBNA"). Among the monomers represented by General formula (II) above, 2,2'-bis(2-hydroxyethoxy)-1,1'-binaphthalene is preferable.

Specific examples of the monomer represented by General formula (III) above include, but not limited to, 9,9-bis[6-(1-hydroxymethoxy)naphthalene-2-yl]fluorene, 9,9-bis[6-(2-hydroxyethoxy)naphthalene-2-yl]fluorene, 9,9-bis[6-(3-hydroxypropoxy)naphthalene-2-yl]fluorene and 9,9-bis[6-(4-hydroxybutoxy)naphthalene-2-yl]fluorene. Among the monomers represented by General formula (III) above, 9,9-bis[6-(2-hydroxyethoxy)naphthalene-2-yl]fluorene is preferable.

In one embodiment of the present invention, the thermoplastic resin may be a homopolymer resin made using only one kind, a bipolymer resin made using two kinds, a terpolymer resin made using three kinds, or a quaterpolymer resin made using four kinds of diol compounds selected from the group consisting of compounds represented by General formulae (I), (II) and (III) above as the monomer(s). Alternatively, in one embodiment of the present invention, the thermoplastic resin may be obtained by blending two or more kinds of the above-mentioned homopolymer resin, bipolymer resin, terpolymer resin and quaterpolymer resin.

In one embodiment of the present invention, the thermoplastic resin may contain, as a monomer, a diol compound other than the diol compound selected from the group consisting of compounds represented by General formulae (I), (II) and (III). Examples of such other diol compound include, but not limited to, 4,4'-biphenyldiol, bis(4-hydroxyphenyl)methane, bis(2-hydroxyphenyl)methane, 2,4'-dihydroxydiphenylmethane, bis(4-hydroxyphenyl)ether, bis(4-hydroxyphenyl)sulfone, 2,4'-dihydroxydiphenylsulfone, bis(2-hydroxyphenyl)sulfone, bis(4-hydroxy-3-methylphenyl)sulfone, bis(4-hydroxyphenyl)sulfoxide, bis(4-hydroxyphenyl)sulfide, bis(4-hydroxyphenyl)ketone, 1,1- bis(4-hydroxyphenyl)ethane, 1,1-bis(4-hydroxyphenyl)-1-phenylethane, bis(4-hydroxyphenyl)diphenylmethane, 2,2-bis(4-hydroxyphenyl)propane, 2,2-bis(4-hydroxy-3-methylphenyl)propane, 1,1-bis(4-hydroxy-3-methylphenyl)ethane, bis(4-hydroxy-3-methylphenyl)methane, 2,2-bis(4-hydroxy-3-t-butylphenyl)propane, 2,2-bis(4-hydroxyphenyl)butane, 1,1-bis(4-hydroxyphenyl)cyclohexane, 1,1-bis(4-hydroxy-3-methylphenyl)cyclohexane, 1,1-bis(4-hydroxyphenyl)cycloundecane, 1,1-bis(4-hydroxyphenyl)cyclododecane, 2,2-bis(4-hydroxy-3-allylphenyl)propane, 3,3,5-trimethyl-1,1-bis(4-hydroxyphenyl)cyclohexane, α,ω-bis[3-(o-hydroxyphenyl)propyl]polydimethyldiphenyl random copolymer siloxane, α,ω-bis[3-(o-hydroxyphenyl)propyl]polydimethylsiloxane, 4,4'-[1,4-phenylenebis(1-methylethylidene)]bisphenol, 4,4'-[1,3-phenylenebis(1-methylethylidene)]bisphenol, adamantane, 2,2-bis(4-hydroxyphenyl)butane, 1,1-bis(4-hydroxyphenyl)-2-ethylhexane, 1,1-bis(4-hydroxyphenyl)-2-methylpropane, 2,2-bis(4-hydroxyphenyl)-4-methylpentane, 1,1-bis(4-hydroxyphenyl)decane, 1,3-bis(4-hydroxyphenyl)-5,7-dimethyladamantane, 2,2-bis(4-(2-hydroxyethoxy)phenyl)propane, 4, 4-bis(2-hydroxyethoxy)biphenyl, 2,2'-(1,4-phenylene)bis(ethane-1-ol), 2,2'-(1,4-phenylene)bis(methane-1-ol), 2,2'-(1,4-phenylenebis(oxy))bis(ethane-1-ol), 1,1-bis(4-hydroxyphenyl)cyclododecane, 1,1-bis(4-hydroxy-3-methylphenyl)cyclododecane, 1,1-bis(4-hydroxy-3-phenylphenyl)cyclododecane, 1,1-bis(4-hydroxy-3-t-butylphenyl)cyclododecane, 1,1-bis(4-hydroxy-3-sec-butylphenyl)cyclododecane, 1,1-bis(4-hydroxy-3-allylphenyl)cyclododecane, 1,1-bis(4-hydroxy-3,5-dimethylphenyl)cyclododecane, 1,1-bis(4-hydroxy-3-fluorophenyl)cyclododecane, 1,1-bis(4-hydroxy-3-chlorophenyl)cyclododecane, 1,1-bis(4-hydroxy-3-bromophenyl)cyclododecane, 7-ethyl-1,1-bis(4-hydroxyphenyl)cyclododecane, 5,6-dimethyl-1,1-bis(4-hydroxyphenyl)cyclododecane, pentacyclopentadecane dimethanol, 1,4-cyclohexanedimethanol, 1,3-adamantanedimethanol, decalin-2,6-dimethanol, tricyclodecanedimethanol, fluoreneglycol, fluorenediethanol and isosorbide. The above-mentioned other diol compound is preferably 2,2-bis(4-hydroxyphenyl)propane.

In one embodiment of the present invention, if the thermoplastic resin contains a polyester resin and/or a polyester carbonate resin, these resins may contain, as a monomer, a compound represented by General formula (V) below:

[Chemical formula 9]

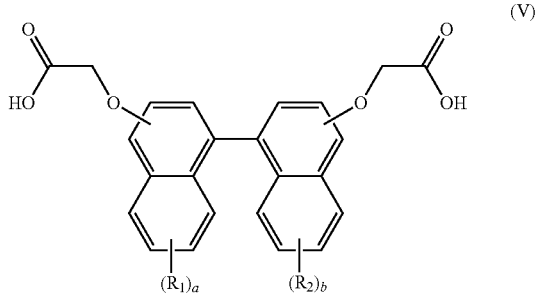

(V)

(in General formula (V), $R_1$ and $R_2$ each independently represent a hydrogen atom, a fluorine atom, a chlorine atom, a bromine atom, an iodine atom, a C1-C6 alkyl group, or a C6-C20 aryl group, a C2-C6 alkenyl group, a C1-C6 alkoxy group or a C7-C17 aralkyl group which may contain a heterocyclic atom selected from an oxygen atom, a nitrogen atom and a sulfur atom, and a and b represent an integer of 0-4).

In one embodiment of the present invention, the thermoplastic resin may contain any of a random copolymer structure, a block copolymer structure or an alternating copolymer structure.

In one embodiment of the present invention, the mass-average molecular weight (Mw) of the thermoplastic resin relative to polystyrene standards may preferably be 20,000-200,000. The mass-average molecular weight (Mw) of the thermoplastic resin relative to polystyrene standards is more preferably 25,000-120,000, still more preferably 28,000-55,000 and particularly preferably 30,000-45,000. As far as the mass-average molecular weight (Mw) of the thermoplastic resin relative to polystyrene standards lies within the above range, the molded article can be prevented from becoming brittle, melt viscosity does not become excessively high so that the produced resin can be removed easily, and also fluidity can be improved to facilitate injection molding in a molten state.

In another embodiment of the present invention, the above-described thermoplastic resin can be blended with other resin(s) to obtain a thermoplastic resin composition, which can be used for production of an optical lens. Examples of other resin(s) include, but not limited to, polyamide, polyacetal, polycarbonate, modified polyphenylene ether, polyethylene terephthalate and polybutylene terephthalate.

(B) Coloring Material

A coloring material is not particularly limited as far as it can be used in the thermoplastic resin composition of the present invention. For example, a dye, a pigment, an organic coloring material, an inorganic coloring material or the like can be used. In one embodiment of the present invention, a coloring material that can be used in the thermoplastic resin composition may contain at least one of a green pigment, a red pigment, a yellow pigment and a purple pigment. In a preferred embodiment, a coloring material that can be used in the thermoplastic resin composition contains a green pigment, a red pigment, a yellow pigment and a purple pigment.

In one embodiment of the present invention, a coloring material that can be used in the thermoplastic resin composition may contain at least one of an anthraquinone-based pigment, a perinone-based pigment, a methine-based pigment, an isoindoline-based pigment, a phthalocyanine-based pigment, a quinacridone-based pigment, an azo-based pigment and a lake pigment.

A green pigment that can be used in the thermoplastic resin composition may be, for example, an anthraquinone-based pigment, a perinone-based pigment or the like, where examples include, but not limited to, Oil Green 5602 manufactured by Arimoto Chemical Co., Ltd., Macrolex Green G manufactured by Lanxess and Oplas Green 533 manufactured by Orient Chemical Industries Co., Ltd.

A red pigment that can be used in the thermoplastic resin composition may be, for example, a perinone-based pigment, an anthraquinone-based pigment or the like, where examples include, but not limited to, Oil Red 5303, Fluorescent Red DR-345, Plast Red 8355, 8360, 8365, 8370, D-54, DR-426N and DR-427N manufactured by Arimoto Chemical Co., Ltd., and Macrolex Red A and Macrolex Red EG manufactured by Lanxess.

A yellow pigment that can be used in the thermoplastic resin composition may be, for example, a methine-based pigment, an anthraquinone-based pigment, a perinone-based pigment or the like, where examples include, but not limited to, Oil Yellow 5001 and Plast Yellow 8000, 8005, 8040, 8050 and 8070 manufactured by Arimoto Chemical Co., Ltd., and Macrolex Yellow 6G manufactured by Lanxess.

A purple pigment that can be used in the thermoplastic resin composition may be, for example, an anthraquinone-based pigment, a perinone-based pigment or the like, where examples include, but not limited to, Plast Violet 8840, 8850 and 8855 manufactured by Arimoto Chemical Co., Ltd., and Macrolex Violet 3R manufactured by Lanxess.

(C) Additional Components

In one embodiment of the present invention, the thermoplastic resin composition may contain an antioxidant and a mold release agent as an additive.

Examples of the antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenye-propionate], pentaerythritol-tetrakis[3-(3,5-di-tert-butyl-4-hydroxyphenyepropionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzylphosphonate-diethylester, tris(3,5-di-tert-butyl-4-hydroxybenzyl)isocyanurate and 3,9-bis{1,1-dimethyl-2-[β-(3-tert-butyl-4-hydroxy-5-methylphenyl)propionyloxy]ethyl}-2,4,8,10-tetraoxaspiro(5,5)undecane.

The antioxidant content in the thermoplastic resin composition is preferably 0.50 mass % or less, more preferably 0.10-0.40 mass %, and particularly preferably 0.20-0.40 mass %.

90 mass % or more of the mold release agent is preferably an ester resulting from an alcohol and a fatty acid. Specific examples of an ester resulting from an alcohol and a fatty acid include an ester resulting from a monohydric alcohol and a fatty acid, and a partial or whole ester resulting from a polyhydric alcohol and a fatty acid. The ester resulting from a monohydric alcohol and a fatty acid is preferably an ester resulting from a monohydric alcohol with a carbon number of 1-20 and a saturated fatty acid with a carbon number of 10-30. Moreover, a partial or whole ester resulting from a polyhydric alcohol and a fatty acid is preferably a partial or whole ester resulting from a polyhydric alcohol with a carbon number of 1-25 and a saturated fatty acid with a carbon number of 10-30.

Specific examples of an ester resulting from a monohydric alcohol and a saturated fatty acid include stearyl stearate, palmityl palmitate, butyl stearate, methyl laurate and isopropyl palmitate. Examples of a partial or whole ester resulting from a polyhydric alcohol and a saturated fatty acid include whole or partial esters of glycerol monostearate, glycerol monostearate, glycerol distearate, glycerol tristearate, sorbitan monostearate, glycerol monobehenate, glycerol monocaprylate, glycerol monolaurate, pentaerythritol monostearate, pentaerythritol tetrastearate, pentaerythritol tetrapelargonate, propylene glycol monostearate, biphenyl biphenate, sorbitan monostearate, 2-ethylhexyl stearate, and dipentaerythritol such as dipentaerythritol hexastearate.

The mold release agent content in the thermoplastic resin composition is preferably 0.50 mass % or less, more preferably 0.01-0.10 mass %, and particularly preferably 0.03-0.05 mass %.

Furthermore, a processing stabilizer, a UV absorber, a fluidity modifier, a crystal nucleating agent, a reinforcing agent, a dye, an antistatic agent, a bluing agent, an antibacterial agent or the like may be added as an additional additive to the thermoplastic resin composition of the present invention.

(D) Impurities

Phenol generated in the course of production and remaining unreacted monomers, i.e., diol and carbonate diester, may be present in the thermoplastic resin of the present invention. The phenol content in the thermoplastic resin is preferably 0.1-3000 ppm, more preferably 0.1-2000 ppm, and particularly preferably 1-1000 ppm, 1-800 ppm, 1-500 ppm or 1-300 ppm. The diol content in the thermoplastic resin is preferably 0.1-5000 ppm, more preferably 1-3000 ppm, still more preferably 1-1000 ppm and particularly preferably 1-500 ppm. Furthermore, the carbonate diester content in the thermoplastic resin is preferably 0.1-1000 ppm, more preferably 0.1-500 ppm and particularly preferably 1-100 ppm. The amounts of phenol and carbonate diester contained in the thermoplastic resin can be adjusted to achieve a resin having physical properties suitable for the purpose. The phenol and carbonate diester contents can appropriately be adjusted by changing the conditions and device for polycondensation. The contents can also be adjusted by changing the conditions of the extrusion step following polycondensation.

If the phenol or carbonate diester content exceeds the above-mentioned range, problems such as deterioration of strength of the molded resin article obtained, and generation of odor may be caused. On the other hand, if the phenol or carbonate diester content falls below the above-mentioned range, plasticity of the molten resin may be deteriorated.

2. Method for Producing Thermoplastic Resin Composition

In one embodiment of the present invention, the thermoplastic resin can be produced according to the method described in WO2018/016516. Specifically, the thermoplastic resin can be produced by allowing a diol compound selected from the group consisting of compounds represented by General formulae (I), (II) and (III) below and a carbonate precursor such as carbonate diester to react in the presence of a base compound catalyst and/or a transesterification catalyst or in the absence of a catalyst while heating under atmospheric or reduced pressure according to a melt polycondensation process. The method for producing the thermoplastic resin composition of the present invention is not limited to this production method.

[Chemical formula 10]

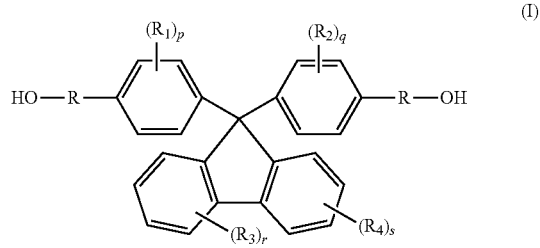

(I)

(In General formula (I), $R_1$-$R_4$ each independently represent a hydrogen atom, a fluorine atom, a chlorine atom, a bromine atom, an iodine atom, a C1-C6 alkyl group, or a C6-C20 aryl group, a C2-C6 alkenyl group, a C1-C6 alkoxy group or a C7-C17 aralkyl group which may contain a heterocyclic atom selected from an oxygen atom, a nitrogen atom and a sulfur atom, p, q, r and s each independently represent an integer of 0-4, and
R is

[Chemical formula 11]

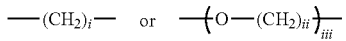

wherein, i represents an integer of 0-10, ii represents an integer of 1-10, and iii represents an integer of 1-10).

[Chemical formula 12]

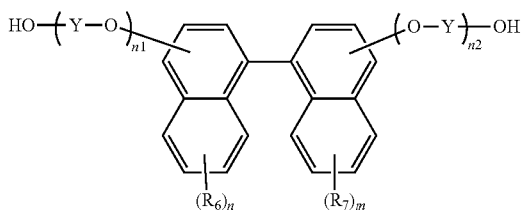

(II)

(In General formula (II),
$R_6$ and $R_7$ are synonymous with $R_1$-$R_4$,
n and m represent an integer of 0-5,
Y represents a C1-C5 alkylene group, and
n1 and n2 each independently represent an integer of 0-10).

[Chemical formula 13]

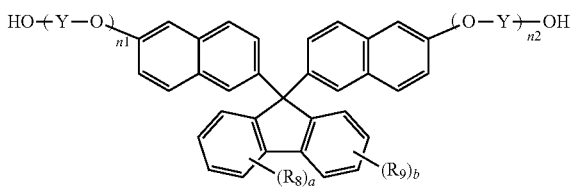

(III)

(In General formula (III),
$R_8$ and $R_9$ are synonymous with $R_1$-$R_4$,
a and b represent an integer of 0-4,
Y represents a C1-C5 alkylene group, and
n1 and n2 each independently represent an integer of 0-10).

In one embodiment of the present invention, the thermoplastic resin composition can be produced by melt kneading the thermoplastic resin generated as described above with a coloring material. The thermoplastic resin of the present invention can be obtained, for example, as pellets by mixing the materials in a tumbler, melt kneading the mixture using a twin-screw extruder or the like, and subjecting the resultant to strand cutting, although the present invention is not limited to this method.

3. Physical Properties of Thermoplastic Resin Composition

The thermoplastic resin composition of the present invention, which is a high refractive index material added with a coloring material, cuts visible light and has infrared light transmittance. Thus, the thermoplastic resin composition of the present invention can be employed for an optical lens of an infrared camera/sensor so that noise caused by visible light can be reduced effectively.

(A) Refractive Index (nD)

In one embodiment of the present invention, the refractive index of the thermoplastic resin composition at a wavelength of 894 nm and 23° C. may be 1.60 or higher. The refractive index of the thermoplastic resin composition of the present invention at a wavelength of 894 nm may be preferably 1.61-1.71, more preferably 1.62-1.70, and particularly preferably 1.64-1.68. The thermoplastic resin composition of the present invention has a high refractive index and thus is a suitable material of an optical lens. Refractive index can be measured in accordance with JIS B7071-2 with a V-block refractometer ("PR-2" manufactured by Carl Zeiss, Jena).

(B) Transmittance

In one embodiment of the present invention, when the thermoplastic resin composition has a thickness of 1 mm, the maximum transmittance at wavelengths of 380-630 nm may be more than 0% and less or equal to 1.00% while the average transmittance at wavelengths of 840-940 nm may be 80% or more. When the thermoplastic resin composition of the present invention has a thickness of 1 mm, the maximum transmittance at wavelengths of 380-630 nm may be preferably more than 0% and less or equal to 0.8%, more preferably more than 0% and less or equal to 0.5%, and still more preferably 0.1% or less. Moreover, when the thermoplastic resin composition of the present invention has a thickness of 1 mm, the average transmittance at wavelengths of 840-940 nm may be preferably 85% or more, more preferably 90% or more, and particularly preferably 99% or more. As far as the maximum transmittance at wavelengths of 380-630 nm and the average transmittance at wavelengths of 840-940 nm are within the above-mentioned ranges, noise caused by visible light can be reduced efficiently, and image accuracy at the measurement wavelengths of infrared cameras and infrared sensors can be enhanced. Furthermore, in a preferred embodiment of the present invention, transmittance at a wavelength of 720 nm may be 50% or less, and transmittance at a wavelength 780 nm may be 50% or more. Transmittance at a wavelength of 720 nm is more preferably 40% or less, and still more preferably 35% or less. Transmittance at a wavelength of 780 nm is more preferably 60% or more, and still more preferably 70% or more. Transmittance can be measured in accordance with JIS K7105 for a 1 mm-thick portion of a stepped test plate by using a spectrophotometer ("U-4100" manufactured by Hitachi High-Tech Corporation).

(C) Glass Transition Temperature (Tg)

In one embodiment of the present invention, the glass transition temperature (Tg) of the thermoplastic resin composition is 90-180° C., more preferably 95-175° C., still more preferably 100-170° C., yet still more preferably 130-170° C., and particularly preferably 135-150° C. As far as the glass transition temperature (Tg) of the thermoplastic resin composition lies within the above-mentioned range, the composition can be used favorably for injection molding. Tg lower than 90° C. narrows the range of the working temperature and thus is unfavorable. On the other hand, Tg exceeding 180° C. increases the melting temperature of the resin, which is likely to cause degradation and staining of the resin and thus is unfavorable. If the glass transition temperature of the resin is too high, difference between the mold temperature and the glass transition temperature of the resin becomes large with a general mold temperature controller. Accordingly, a resin with a too high glass transition temperature is difficult to be used and thus unfavorable for usage that requires strict surface precision of the product. Furthermore, from the viewpoints of fluidity and heat resistance upon molding, the lower limit value of Tg is preferably 130° C. and more preferably 135° C. while the upper limit value of Tg is preferably 160° C. and more preferably 150° C.

(D) Other Attributes

The thermoplastic resin composition of the present invention is highly resistant to damp heat. Damp heat resistance can be evaluated by subjecting a molded optical article obtained using the thermoplastic resin composition to "PCT test" (pressure cooker test), and measuring the total light transmittance of the molded optical article after the test. PCT test can be performed by maintaining an injection molded article with a diameter of 50 mm and a thickness of 3 mm under the conditions of 120° C., 0.2 MPa and 100% RH for 20 hours. The total light transmittance of the thermoplastic resin composition of the present invention after the PCT test is 60% or more, preferably 70% or more, more preferably 75% or more, still more preferably 80% or more, and particularly preferably 85% or more. A thermoplastic resin composition with a total light transmittance of 60% or more is assumed to have higher damp heat resistance than conventional polycarbonate resins.

The b-value of the thermoplastic resin composition of the present invention is preferably 5 or less. The smaller the b-value, the weaker the yellowness and thus the better the hue.

The amount of residual phenol contained in the thermoplastic resin composition of the present invention is preferably 500 ppm or less, more preferably 300 ppm or less, and still more preferably 50 ppm or less.

The amount of residual diphenyl carbonate (DPC) contained in the thermoplastic resin composition of the present invention is preferably 200 ppm or less, more preferably 100 ppm or less, and still more preferably 50 ppm or less.

4. Optical Lens

An optical lens of the present invention can be obtained by molding the above-described thermoplastic resin composition of the present invention into a lens shape using an injection molding machine or an injection compression molding machine. In one embodiment of the present invention, the optical lens can be produced according to the method described in WO2018/016516. While the conditions for injection molding are not particularly limited, molding temperature is preferably 180-300° C. and more preferably 180-290° C. In addition, injection pressure is preferably 50-1700 kg/cm$^2$.

In order to avoid contamination in the optical lens as much as possible, molding environment obviously needs to be a low-dust environment, which is preferably a class of 1000 or less, and more preferably a class of 100 or less.

The optical lens of the present invention may preferably be used in a form of an aspheric lens as appropriate. Since an aspheric lens can reduce spherical aberration to substantially zero with a single lens, there is no need of using a combination of multiple spheric lenses to eliminate spherical aberration and therefore weight and production cost can be reduced. Thus, an aspheric lens is particularly useful as a camera lens among various optical lenses. Astigmatism of the aspheric lens is preferably 0-15 mλ, and more preferably 0-10 mλ.

While the thickness of the optical lens of the present invention is not particularly limited and can be set within a wide range according to its application, it is preferably 0.01-30 mm and more preferably 0.1-15 mm. If necessary, the surface of the optical lens of the present invention may be provided with a coat layer such as an anti-reflective layer or a hard coat layer. An anti-reflective layer may be a monolayer or a multilayer made of either an organic or an inorganic, preferably an inorganic, material. Specific examples include oxides and fluorides such as silicon oxide, aluminum oxide, zirconium oxide, titanium oxide, cerium oxide, magnesium oxide and magnesium fluoride. Among them, silicon oxide and zirconium oxide are more favorable, and a combination of silicon oxide and zirconium oxide is still more favorable. Furthermore, as to the anti-reflective layer, while the combination of mono/multi-layers, the components thereof, the combination of their thicknesses and the like are not particularly limited, the anti-reflective layer preferably has a double- or triple-layered, particularly preferably a triple-layered, structure. In addition, the anti-reflective layer is preferably formed to have a total thickness that accounts for 0.00017-3.3% relative to the thickness of the optical lens, specifically, a thickness of 0.05-3 particularly preferably 1-2 μm.

In one embodiment of the present invention, the optical lens may be an infrared camera lens. In a preferred embodiment of the present invention, the optical lens is a biometric authentication camera lens.

EXAMPLES

Hereinafter, the present invention will be described by way of examples, although these examples are not intended to limit the present invention.

(1) Transmittance

Pellets of the thermoplastic resin composition were dried at 120° C. for 5 hours using a hot-air circulation dryer before being molded into a two-step stepped test plate with a width of 40 mm, a length of 80 mm and thicknesses of 1 mm and 2 mm, in an injection molding machine (ROBOSHOT S-2000i30A manufactured by Fanuc Corporation) under the following conditions: resin temperature of 260° C., mold temperature of 130° C. and molding cycle time of 30 seconds. Transmittance of the 1 mm-thick portion of the stepped test plate was measured in accordance with JIS K7105 using a spectrophotometer ("U-4100" manufactured by Hitachi High-Tech Corporation). Maximum transmittance at wavelengths of 380-630 nm refers to the maximum value among the 250 data acquired by measuring transmittance at wavelengths of 380-630 nm for every 1 nm. Average transmittance at wavelengths of 840-940 nm refers to the average value of the 100 data acquired by measuring transmittance at wavelengths of 840-940 nm for every 1 nm.

(2) Refractive Index (nD)

Pellets of the thermoplastic resin or the thermoplastic resin composition were dried at 120° C. for 5 hours using a hot-air circulation dryer before being molded into a test plate with a width of 40 mm, a length of 40 mm and a thickness of 3 mm, in an injection molding machine (ROBOSHOT S-2000i30A manufactured by Fanuc Corporation) under the following conditions: resin temperature of 260° C., mold temperature of 130° C. and molding cycle time of 30 seconds. Refractive index was measured in accordance with JIS B7071-2 with a V-block refractometer ("PR-2" manufactured by Carl Zeiss, Jena).

(3) Abbe Number (v)

The Abbe number (v) of the thermoplastic resin is preferably 24 or less, more preferably 22 or less, and still more preferably 20 or less. Abbe number can be calculated from the refractive indices at wavelengths of 486 nm, 589 nm and 656 nm at 23° C., using the following equation. The refractive indices at wavelengths of 486 nm, 589 nm and 656 nm can be measured in accordance with the method of JIS-K-7142 for a film with a thickness of 0.1 mm by using an Abbe refractometer.

$$v=(nD-1)/(nF-nC)$$

nD: Refractive index at wavelength of 589 nm
nC: Refractive index at wavelength of 656 nm
nF: Refractive index at wavelength of 486 nm (4) Mass-Average Molecular Weight Relative to Polystyrene Standards (Mw)

Gel permeation chromatography (GPC) using tetrahydrofuran as an eluent was employed to generate a calibration curve using polystyrene standards with known molecular weights (molecular weight distribution=1). Based on this calibration curve, Mw was calculated from the retention time in GPC.

(5) Glass Transition Temperature (Tg)

Glass transition temperature was measured in accordance with JIS K7121-1987 using a differential scanning calorimeter (DSC). X-DSC7000 from Hitachi High-Tech Science Corporation was used as the DSC. Heating rate was 10° C./min.

(6) Total Light Transmittance

For a 3 mm-thick plate of the thermoplastic resin that was prepared for measuring the b-value hereinbelow, total light transmittance was measured according to the method of JIS-K-7361-1 using spectrophotometer SE2000 manufactured by Nippon Denshoku Industries Co., Ltd.

(7) b-Value

The produced resin was vacuum dried at 120° C. for 4 hours, and then subjected to injection molding in an injection molding machine (FANUC ROBOSHOT α-S30iA) at a cylinder temperature of 270° C. and a mold temperature of Tg−10° C. to give a disc-shaped test plate with a diameter of 50 mm and a thickness of 3 mm. This plate was used to measure the b-value in accordance with JIS K7105. The smaller the b-value, the weaker the yellowness and thus the better the hue. Spectrophotometer SE2000 manufactured by Nippon Denshoku Industries Co., Ltd. was used for the measurement of the molded plate.

(8) Amounts of Residual Phenol and Residual Diphenyl Carbonate (DPC)

Approximately 1.0 g of polycarbonate resin was precisely weighed before being dissolved in 10 ml of dichloromethane, and the resultant was gradually added to 100 ml of methanol while stirring to allow the resin to reprecipitate. After thorough stirring, the precipitate was filtered and the filtrate was concentrated in an evaporator to give a solid, to which 1.0 g of precisely weighed reference material solution was added. Furthermore, 1 g of chloroform was added to give a dilution for quantification by GC-MS.

Reference material solution: 200 ppm, a solution of 2,4,6-trimethylphenol in chloroform
Measurement instrument (GC-MS): Agilent HP 6890/5973 MSD
Column: Capillary column DB-SMS, 30 m×0.25 mm I.D., film thickness 0.5 μm
Oven temperature program: 50° C. (5 min hold)-300° C. (15 min hold), 10° C./min
Inlet temperature: 300° C., injection volume: 1.0 μl (split ratio 25)
Ionization method: EI
Carrier gas: He, 1.0 ml/min
Aux temperature: 300° C.
Mass scan range: 33-700

(9) Amounts of Residual BHEBN and Residual BPPEF 0.5 g of weighed polycarbonate resin was dissolved in 50 ml of tetrahydrofuran (THF) to give a sample solution. A calibration curve was prepared as a reference standard using a pure product of each compound to quantify 2 μL of the sample solution by LC-MS under the following measurement conditions. Here, detection limit under these measurement conditions was 0.01 ppm. Amounts of residual monomers other than residual BHEBN and residual BPPEF can also be measured in the same manner.

LC-MS Measurement Conditions:
Measurement instrument (LC portion): Agilent Infinity 1260 LC System
Column: ZORBAX Eclipse XDB-18, and guard cartridge
Mobile Phases:
A: 0.01 mol/L aqueous solution of ammonium acetate
B: 0.01 mol/L solution of ammonium acetate in methanol
C: THF
Mobile Phase Gradient Program:

TABLE 1

| | Composition of mobile phases (%) | | |
|---|---|---|---|
| Time (min) | A | B | C |
| 0 | 10 | 75 | 15 |
| 10 | 9 | 67.5 | 23.5 |
| 10.1 | 0 | 25 | 75 |
| 30 | 0 | 25 | 75 |

Flow rate: 0.3 ml/min
Column temperature: 45° C.
Detector: UV (225 nm)
Measurement instrument (MS portion): Agilent 6120 single quad LCMS System
Ionization source: ESI
Polar: Positive
Fragmentor voltage: 100 V
Dry gas: 10 L/min, 350° C.
Nebulizer: 50 psi
Capillary voltage: 3000 V
Measurement Ions:
BHEBN: Ionic species=[M+NH4]−, m/z=392.1
BPPEF: Ionic species=[M+NH4]−, m/z=608.3

Production of Thermoplastic Resin Composition

[Manufacturing Example 1] Thermoplastic Resin a (High Refractive Index Material)

As raw materials, 8.0 kg (14.85 mol) of 9,9-bis[6-(2-hydroxyethoxy)naphthalene-2-yl]fluorene (also referred to as "BNEF"), 7.5 kg (20.03 mol) of 2,2'-bis(2-hydroxyethoxy)-1,1'-binaphthalene (also referred to as "BHEBN"), 7.5 kg (12.70 mol) of 9,9-bis[4-(2-hydroxyethoxy)-3-phenylphenyl]fluorene (also referred to as "BPPEF"), 10.5 kg (49.02 mol) of diphenyl carbonate (also referred to as "DPC") and 16 milliliters of an aqueous solution of 2.5× $10^{-2}$ mol/liter sodium hydrogen carbonate (4.0×$10^{-4}$ mol, i.e., 8.4×$10^{-6}$ mol relative to a total of 1 mol of dihydroxy compounds) were placed in a 50 L reactor equipped with a stirrer and a distillation unit, and heated at 180° C. in nitrogen atmosphere at 760 mmHg After 30 minutes of heating, complete dissolution of the raw materials was confirmed before stirring under the same conditions for 120 minutes. Subsequently, the vacuum degree was adjusted to 200 mmHg while the temperature was increased to 200° C.

at a rate of 60° C./hr. At the same time, initiation of distillation of the byproduct, phenol was confirmed. Thereafter, reaction was allowed to take place while maintaining the temperature at 200° C. for 20 minutes. The temperature was further increased to 230° C. at a rate of 75° C./hr. Ten minutes later, the vacuum degree was adjusted to 1 mmHg or lower by spending 2 hours while maintaining that temperature. Subsequently, the temperature was increased to 245° C. at a rate of 60° C./hr before additional 40 minutes of stirring. At the end of the reaction, nitrogen was introduced into the reactor to restore atmospheric pressure and the generated thermoplastic resin was pelletized and taken out. The mass-average molecular weight relative to polystyrene standards (Mw) and the glass transition temperature (Tg) of the resulting resin were 32,000 and 142° C., respectively.

[Chemical formula 14]

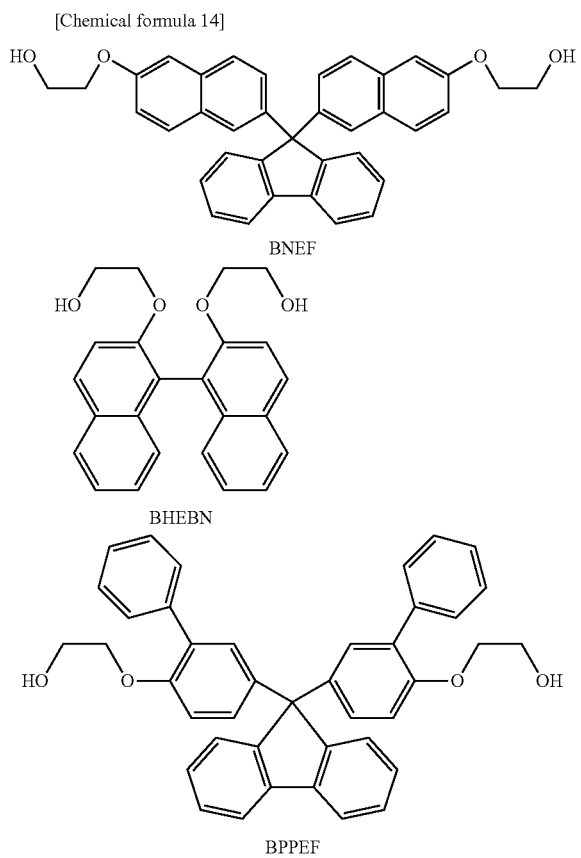

[Chemical formula 15]

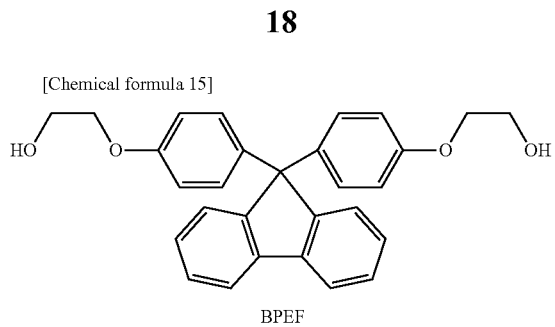

[Manufacturing Example 3] Thermoplastic Resin C
(High Refractive Index Material)

A thermoplastic resin was obtained in the same manner as in Example 1 except that 18.15 kg (41.39 mol) of BPEF, 1.41 kg (6.18 mol) of 2,2'-bis(4-hydroxyphenyl)propane (also referred to as "BPA"), 10.5 kg (49.02 mol) of DPC and 16 milliliters of an aqueous solution of $2.5 \times 10^{-2}$ mol/liter sodium hydrogen carbonate ($4.0 \times 10^{-4}$ mol, i.e., $8.4 \times 10^{-6}$ mol relative to a total of 1 mol of dihydroxy compounds) were used as raw materials. The mass-average molecular weight relative to polystyrene standards (Mw) and the glass transition temperature (Tg) of the resulting resin were 31,000 and 145° C., respectively.

[Chemical formula 16]

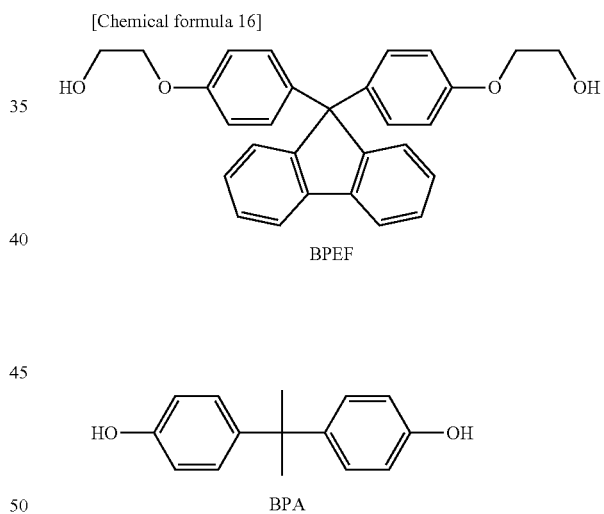

[Manufacturing Example 2] Thermoplastic Resin B
(High Refractive Index Material)

A thermoplastic resin was obtained in the same manner as in Example 1 except that 20.86 kg (47.56 mol) of 9,9-bis[4-(2-hydroxyethoxy)-phenyl]fluorene (also referred to as "BPEF"), 10.5 kg (49.02 mol) of DPC and 16 milliliters of an aqueous solution of $2.5 \times 10^{-2}$ mol/liter sodium hydrogen carbonate ($4.0 \times 10^{-4}$ mol, i.e., $8.4 \times 10^{-6}$ mol relative to a total of 1 mol of dihydroxy compounds) were used as raw materials. The mass-average molecular weight relative to polystyrene standards (Mw) and the glass transition temperature (Tg) of the resulting resin were 31,000 and 145° C., respectively.

[Manufacturing Example 4] Thermoplastic Resin E
(High Refractive Index Material)

A thermoplastic resin was obtained in the same manner as in Example 1 except that 4.53 kg (12.1 mol) of BHEBN, 8.72 kg (14.8 mol) of BPPEF, 5.99 kg (27.9 mol) of DPC and 16 milliliters of an aqueous solution of $2.5 \times 10^{-2}$ mol/liter sodium hydrogen carbonate ($4.0 \times 10^{-4}$ mol, i.e., $8.4 \times 10^{-6}$ mol relative to a total of 1 mol of dihydroxy compounds) were used as raw materials. The mass-average molecular weight relative to polystyrene standards (Mw) and the glass transition temperature (Tg) of the resulting resin were 32,000 and 140° C., respectively.

[Chemical formula 17]

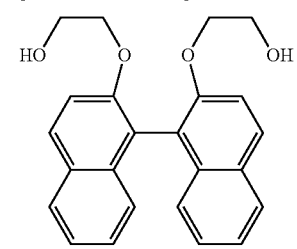

BHEBN

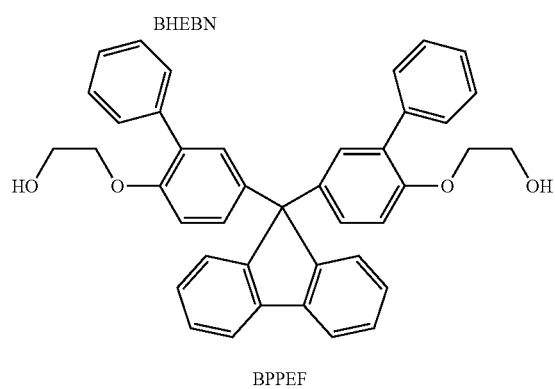

BPPEF

Thermoplastic Resin D (Common Thermoplastic Resin)

Iupilon S-3000 manufactured by Mitsubishi Engineering-Plastics Corporation (BPA homopolymer resin) was used as Thermoplastic resin D.

Production of Thermoplastic Resin Composition

Examples 1-8

The thermoplastic resin, a green pigment, a red pigment, a yellow pigment and a purple pigment were blended in the proportions (mass parts) indicated in Table 2, and mixed in a tumbler for 20 minutes. Thereafter, the mixture was melt kneaded in a twin-screw extruder (TEX30α manufactured by Japan Steel Works, Ltd.) at a cylinder temperature of 260° C. and the resultant was subjected to strand cutting, thereby obtaining pellets of the thermoplastic resin composition.

Comparative Example 1

A thermoplastic resin composition containing Thermoplastic resin A (a high refractive index material) as a thermoplastic resin but free of a color material was employed as Comparative example 1 (Table 2).

Comparative Example 2

A thermoplastic resin composition containing Thermoplastic resin A (a high refractive index material) as a thermoplastic resin and carbon black as a coloring material was employed as Comparative example 2 (Table 2).

Comparative Example 3

A thermoplastic resin composition containing Thermoplastic resin D (a common thermoplastic resin) as a thermoplastic resin, a green pigment, a red pigment, a yellow pigment and a purple pigment was employed as Comparative example 3 (Table 2).

For the thermoplastic resin compositions obtained in Examples 1-8 and Comparative examples 1-3, refractive index at a wavelength of 894 nm, maximum transmittance at wavelengths of 380-630 nm (unit: %), transmittance at a wavelength of 720 nm (unit: %), transmittance at a wavelength of 780 nm (unit: %) and average transmittance at wavelengths of 840-940 nm (unit: %), when the thickness of the thermoplastic resin composition was 1 mm, were measured and the results are shown in Table 2.

TABLE 2

| | | | | | | Examples | | | | | | | | Comparative examples | | |
|---|---|---|---|---|---|---|---|---|---|---|---|---|---|---|---|---|
| | | | Color index | Structure | 1 | 2 | 3 | 4 | 5 | 6 | 7 | 8 | 1 | 2 | 3 |
| | | | | | | | | | Weight parts | | | | | | |
| Composition | Base resin | Thermoplastic resin A | — | High refractive index material | 100 | 100 | 100 | 100 | 100 | 0 | 0 | 0 | 100 | 100 | 0 |
| | | Thermoplastic resin B | — | High refractive index material | 0 | 0 | 0 | 0 | 0 | 100 | 0 | 0 | 0 | 0 | 0 |
| | | Thermoplastic resin C | — | High refractive index material | 0 | 0 | 0 | 0 | 0 | 0 | 100 | 0 | 0 | 0 | 0 |
| | | Thermoplastic resin D | — | Common PC | 0 | 0 | 0 | 0 | 0 | 0 | 0 | 0 | 0 | 0 | 100 |
| | | Thermoplastic resin E | — | High refractive index material | 0 | 0 | 0 | 0 | 0 | 0 | 0 | 100 | 0 | 0 | 0 |
| | Coloring material | Oil Green 5602 | Solvent Green 3 | Anthraquinone-based | 0.20 | 0.13 | 0.08 | 0.06 | 0.05 | 0.20 | 0.20 | 0.20 | 0 | 0 | 0.20 |
| | | Plast Red 8370 | Solvent Red 179 | Perinone-based | 0.14 | 0.12 | 0.09 | 0.06 | 0.05 | 0.14 | 0.14 | 0.14 | 0 | 0 | 0.14 |
| | | Macrolex Yellow 6G | Disperse Yellow 201 | Methine-based | 0.04 | 0.04 | 0.04 | 0.03 | 0.02 | 0.04 | 0.04 | 0.04 | 0 | 0 | 0.04 |
| | | Macrolex Violet 3R | Solvent Violet 36 | Anthraquinone-based | 0.03 | 0.03 | 0.03 | 0.03 | 0.02 | 0.03 | 0.03 | 0.03 | 0 | 0 | 0.03 |
| | | Carbon Black #1000 | Pigment Black 7 | Carbon black | 0 | 0 | 0 | 0 | 0 | 0 | 0 | 0 | 0 | 0.10 | 0 |

TABLE 2-continued

| | | | Examples | | | | | | | | Comparative examples | | |
|---|---|---|---|---|---|---|---|---|---|---|---|---|---|
| | | | 1 | 2 | 3 | 4 | 5 | 6 | 7 | 8 | 1 | 2 | 3 |
| | Color index | Structure | | | | | Weight parts | | | | | | |
| Effect | Transmittance (1 mm) | 380-630 nm | 0.02 | 0.02 | 0.10 | 0.50 | 0.80 | 0.02 | 0.02 | 0.02 | 99 | 0.02 | 0.02 |
| | | 720 nm | 15 | 30 | 39 | 44 | 48 | 15 | 15 | 15 | 99 | 0.02 | 15 |
| | | 780 nm | 96 | 97 | 98 | 99 | 99 | 96 | 96 | 96 | 99 | 0.05 | 95 |
| | | 840-940 nm (average) | 99 | 99 | 99 | 99 | 99 | 99 | 99 | 99 | 99 | 0.07 | 97 |
| | Refractive index at 894 nm | | 1.65 | 1.65 | 1.65 | 1.65 | 1.65 | 1.62 | 1.61 | 1.64 | 1.65 | 1.65 | 1.57 |

As shown in Table 2, the thermoplastic resin compositions of the present invention containing a high refractive index material and a coloring material can detect infrared light and can cut visible light effectively. Thus, the thermoplastic resin composition of the present invention can be used as an optical lens for an infrared camera/sensor to reduce noise caused by visible light and enhance image accuracy.

The invention claimed is:

1. A thermoplastic resin composition comprising:
   a thermoplastic resin; and
   a coloring material,
wherein:
   the refractive index at a wavelength of 894 nm is 1.60 or higher; and
   when the thickness of said thermoplastic resin composition is 1 mm, the maximum transmittance at wavelengths of 380-630 nm is more than 0% and less or equal to 1.00%, and the average transmittance at wavelengths of 840-940 nm is 80% or more,
   wherein the thermoplastic resin comprises, as a monomer, at least one diol compound selected from the group consisting of compounds represented by General formulae (I) and (II) below; and at least one compound selected from the group consisting of compounds represented by General formulae (III), and (V) below:

[Chemical formula 1]

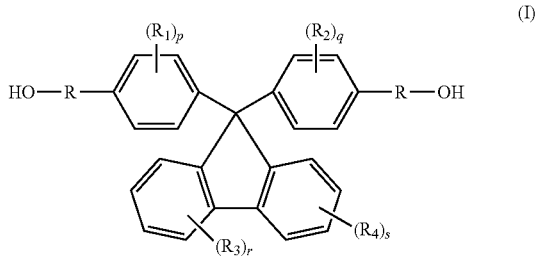
(I)

wherein in General formula (I),
$R_1$-$R_4$ each independently represents a hydrogen atom, a fluorine atom, a chlorine atom, a bromine atom, an iodine atom, a C1-C6 alkyl group, or a C6-C20 aryl group, a C2-C6 alkenyl group, a C1-C6 alkoxy group or a C7-C17 aralkyl group which may contain a heterocyclic atom selected from an oxygen atom, a nitrogen atom and a sulfur atom, p, q, r and s each independently represents an integer of 0-4, and
R is

[Chemical formula 2]

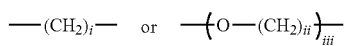

wherein i represents an integer of 0-10, ii represents an integer of 1-10, and iii represents an integer of 1-10;

[Chemical formula 3]

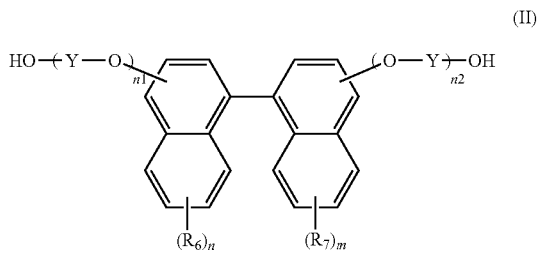
(II)

wherein in General formula (II),
$R_6$ and $R_7$ are synonymous with $R_1$-$R_4$,
n and m represent an integer of 0-5,
Y represents a C1-C5 alkylene group, and
n1 and n2 each independently represents an integer of 0-10;

[Chemical formula 4]

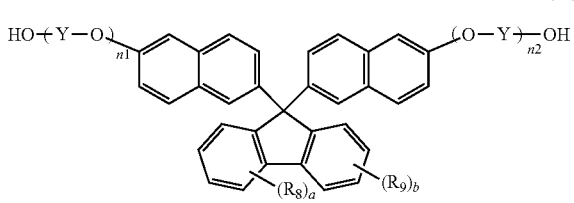
(III)

wherein in General formula (III),
$R_8$ and $R_9$ are synonymous with $R_1$-$R_4$,
a and b represent an integer of 0-4,
Y represents a C1-C5 alkylene group, and
n1 and n2 each independently represents an integer of 0-10; and

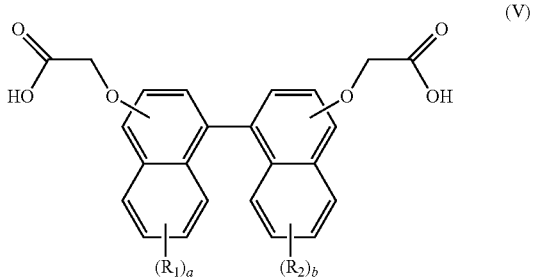

wherein in General formula (V),

R₁ and R₂ each independently represents a hydrogen atom, a fluorine atom, a chlorine atom, a bromine atom, an iodine atom, a C1-C6 alkyl group, or a C6-C20 aryl group, a C2-C6 alkenyl group, a C1-C6 alkoxy group or a C7-C17 aralkyl group which may contain a heterocyclic atom selected from an oxygen atom, a nitrogen atom and a sulfur atom, and a and b represent an integer of 0-4.

2. The thermoplastic resin composition according to claim 1, wherein the thermoplastic resin comprises a resin selected from the group consisting of a polycarbonate resin, a polyester resin and a polyester carbonate resin.

3. The thermoplastic resin composition according to claim 1, wherein the coloring material comprises at least one of a green pigment, a red pigment, a yellow pigment and a purple pigment.

4. The thermoplastic resin composition according to claim 1, wherein the coloring material comprises at least one of an anthraquinone-based pigment, a perinone-based pigment, a methine-based pigment, an isoindoline-based pigment, a phthalocyanine-based pigment, a quinacridone-based pigment, an azo-based pigment and a lake pigment.

5. The thermoplastic resin composition according to claim 1, wherein when the thickness of said thermoplastic resin composition is 1 mm, the maximum transmittance at wavelengths of 380-630 nm is more than 0% and less or equal to 0.8%.

6. The thermoplastic resin composition according to claim 1, wherein when the thickness of said thermoplastic resin composition is 1 mm, the maximum transmittance at wavelengths of 380-630 nm is more than 0% and less or equal to 0.5%.

7. An optical lens comprising the thermoplastic resin composition according to claim 1.

8. An infrared camera lens comprising the thermoplastic resin composition according to claim 1.

9. A biometric authentication camera lens comprising the thermoplastic resin composition according to claim 1.

10. The thermoplastic resin composition according to claim 1, wherein the coloring material comprises an anthraquinone-based pigment, a perinone-based pigment, or a methine-based pigment.

11. The thermoplastic resin composition according to claim 1, comprising, as a monomer, the compound represented by General formula (V).

* * * * *